(12) United States Patent
Horvath

(10) Patent No.: US 7,401,609 B2
(45) Date of Patent: Jul. 22, 2008

(54) COOKING GRILL

(76) Inventor: Leslie A. Horvath, 35 Midridge Close S.E., Calgary, Alberta (CA) T2X 1G2

( * ) Notice: Subject to any disclaimer, the term of this patent is extended or adjusted under 35 U.S.C. 154(b) by 0 days.

(21) Appl. No.: 09/972,250

(22) Filed: Oct. 9, 2001

(65) Prior Publication Data

US 2003/0066521 A1    Apr. 10, 2003

(51) Int. Cl.
*A47J 33/00* (2006.01)
(52) U.S. Cl. .................... 126/30; 126/9 R; 126/9 B
(58) Field of Classification Search .................. 126/30, 126/9 R, 9 B; 248/150, 157
See application file for complete search history.

(56) References Cited

U.S. PATENT DOCUMENTS

| | | | | |
|---|---|---|---|---|
| 4,569,327 A | * | 2/1986 | Velten | 126/25 A |
| 4,782,813 A | * | 11/1988 | Kopke | 126/25 A |
| 5,333,540 A | * | 8/1994 | Mazzocchi | 99/421 H |
| 5,802,962 A | * | 9/1998 | Goldyn | 99/421 H |
| 6,439,111 B1 | * | 8/2002 | Lu | 99/449 |
| 6,532,951 B1 | * | 3/2003 | Sallie et al. | 126/506 |

* cited by examiner

*Primary Examiner*—Alfred Basichas

(57) ABSTRACT

A cooking grill has a bottom for accommodating a fire producing source, a plurality of legs turnably connected with the bottom and turnable between a storage position in which they are substantially coextensive with bottom and an operative position in which they extend substantially perpendicular to the bottom and upwardly from the latter, elements for fixing the legs in each of the positions, and a grate arrangeable between the legs and connectable to the legs, elements for holding the grill on the legs.

7 Claims, 3 Drawing Sheets

COOKING GRILL

BACKGROUND OF THE INVENTION

The present invention relates generally to cooking grills.

Cooking grills are known in the art. Some of the cooking grills are disclosed for example in U.S. Pat. Nos. 4,829,977; 1,540,434; 4,541,406; 2,839,043; 2,515,521; 4,726,349 and design Pat. No. 414,648, international patent document WO 79/00504, and the publication Business Wire—"Just in Time for Summer: Hot Tips for Finding the Perfect Barbecue", May 16, 2000.

It is believed that the cooking grills can be further improved.

SUMMARY OF THE INVENTION

Accordingly, it is an object of the present invention to provide a cooking grill which is a further improvement of the existing cooking grills.

In keeping with these objects and with others which will become apparent hereinafter, one feature of present invention resides, briefly stated, in a cooking grill which has a bottom for accommodating a fire producing source; a plurality of legs turnably connected with said bottom and turnable between a storage position in which they are substantially coextensive with bottom and an open position in which they extend substantially perpendicular to said bottom and upwardly from the latter; means for fixing said legs in each of said positions; a grate arrangeable between said leg and connectable to said legs; and means for holding said grate on said legs.

When the cooking grill is designed in accordance with the present invention, it provides a further improvement in the design, manufacture and operation of the cooking grill.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
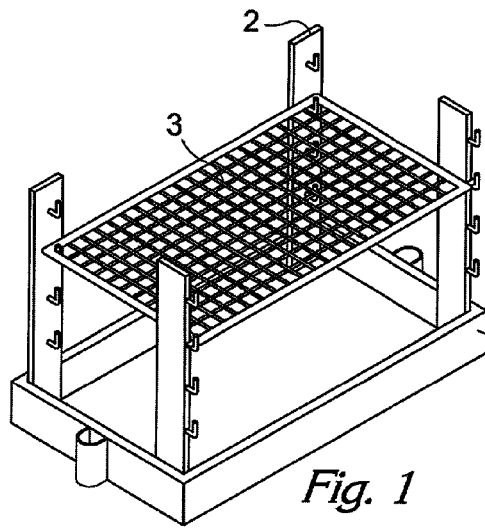
FIG. 1 is a perspective view showing a cooking grill in accordance with the present invention.
Figure 2:
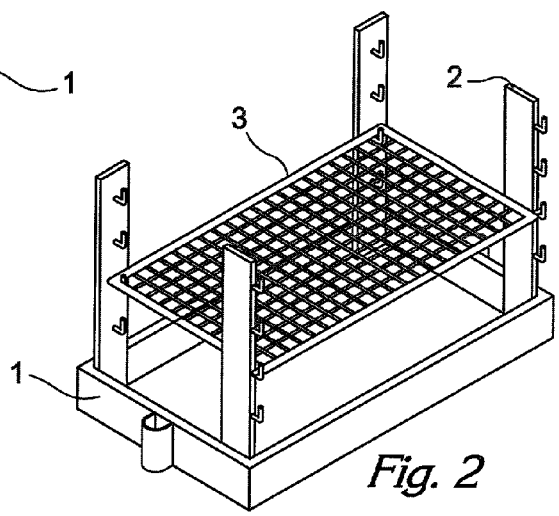
FIG. 2 is a view substantially corresponding to the view of FIG. 1 but showing a grate of the cooking grill in a lower position.

A cooking grill in accordance with the present invention has a bottom which is identified as a whole with reference numeral 1. The bottom can be formed as a box having a substantially horizontal lower plate and a substantially vertical peripherally closed wall extending upwardly from the horizontal plate. The cooking grill has a plurality of legs which is identified with reference numeral 2. In the shown embodiment the bottom 1 is rectangular and there are four legs connected to the bottom 1 turnably between a storage position and an operative position as will be explained herein below. The cooking grill further has a grate which is identified with reference numeral 3. In FIG. 1 the grate is arranged at one height, while in FIG. 2 the grate 3 is arranged at the height which is lower than the height shown in FIG. 1.

Figure 5:
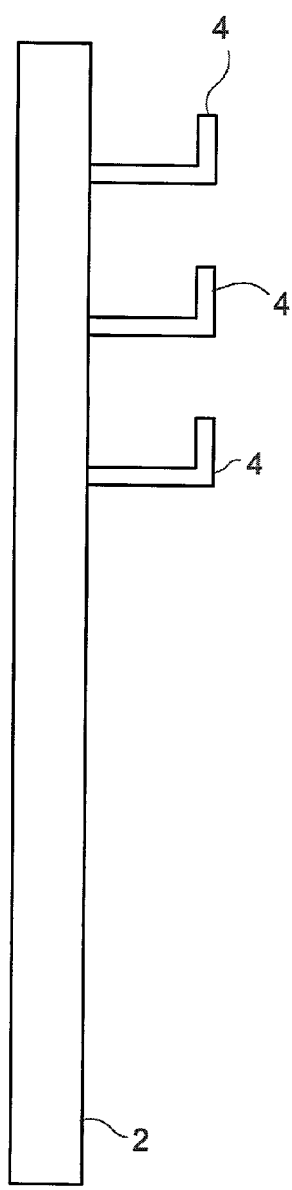
FIG. 5 is a view showing a detail of a leg of the cooking grill.

As shown in FIG. 5, each leg can be provided with at least one arm which is substantially horizontal so as to support the corresponding corner of the grate 3. A plurality of the arms 4 can be arranged at different heights on each leg, so as to support the grate at a corresponding height.

Figure 6:
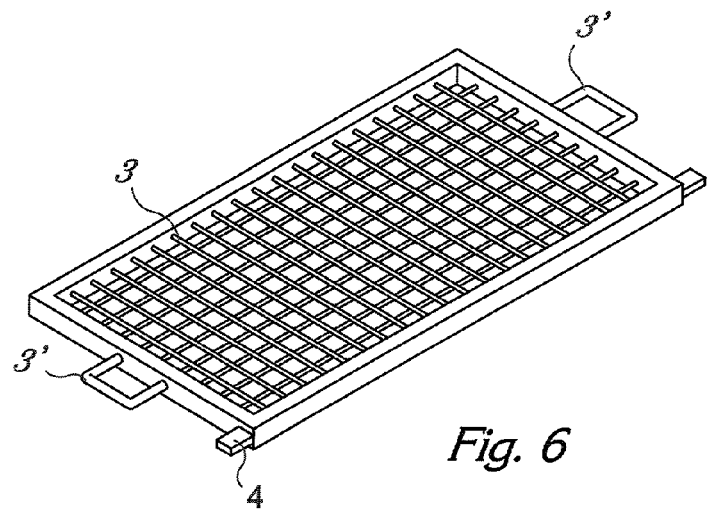
FIG. 6 is a view showing the grate of the cooking grill separately.

As can be seen from FIG. 6 the grate 3 has handles 3' at the opposite sides, to facilitate the removal of the grate from the arms and placement of the grate onto the corresponding arms on the legs of the bottom.

It is to be understood that when a fire source, for example charcoal is placed in the bottom, and a product is placed on the grate, the product is cooked by fire produced by the fire source.

Figure 3:
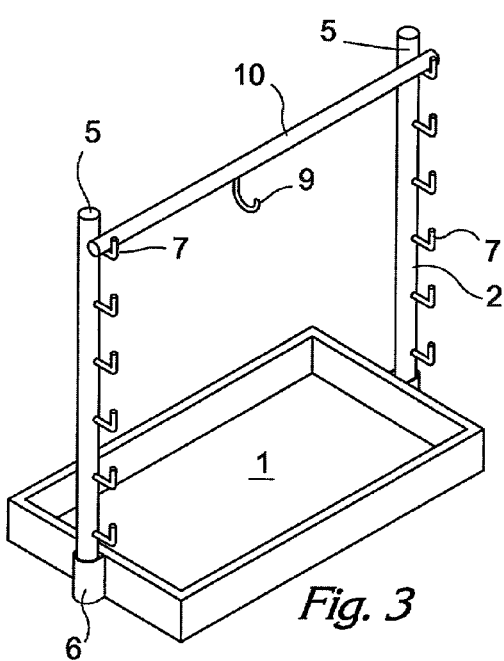
FIG. 3 is a view showing additional elements of the cooking grill for cooking the product on an elongated product supporting element.
Figure 4:
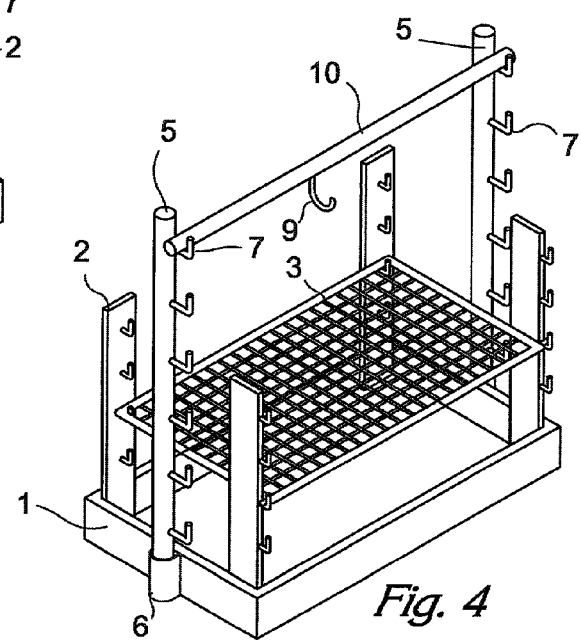
FIG. 4 is a view showing the inventive cooking grill provided with the grate and with the elongated product supporting element.

As shown in FIG. 3, two vertical supporting elements 5 are arranged at two opposite sides of the bottom 1 and removably connected to the later by a sockets 6 in which the lower ends of the vertical elements 5 are introduced. The upper ends of the vertical elements 5 can support an elongated product supporting element, for example a rod 10 provided for example with a hook 9. A corresponding product can be supported on the hook 9. The rod 10 can be held in the upper ends of the elongated elements 5, which for example are provided with receiving cavities and the like. A plurality of supporting projections 7 extend from the vertical elements 5, so as to arrange the elongated product supporting element 10 at different heights, for cooking. As shown in FIG. 4, both the grill 3 and the elongated product supporting element can be arranged simultaneously in the operative position.

Figure 7:
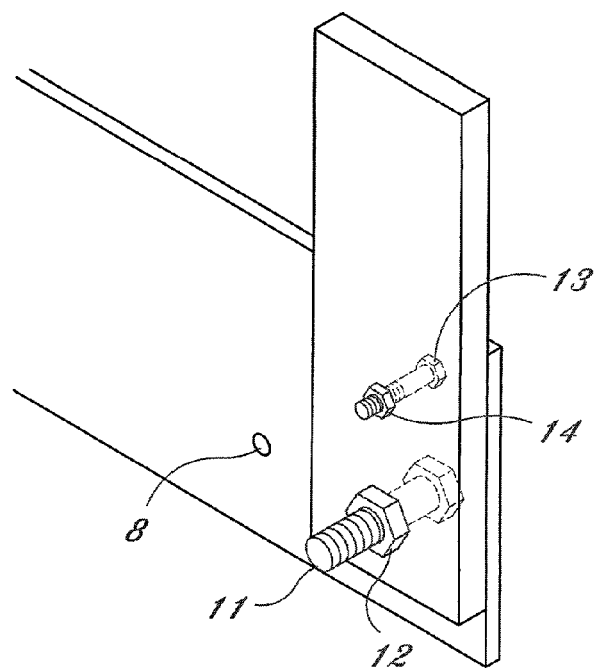
FIG. 7 is a view showing one of the legs attached to a bottom of the inventive cooking grill, on a perspective view.
Figure 8:
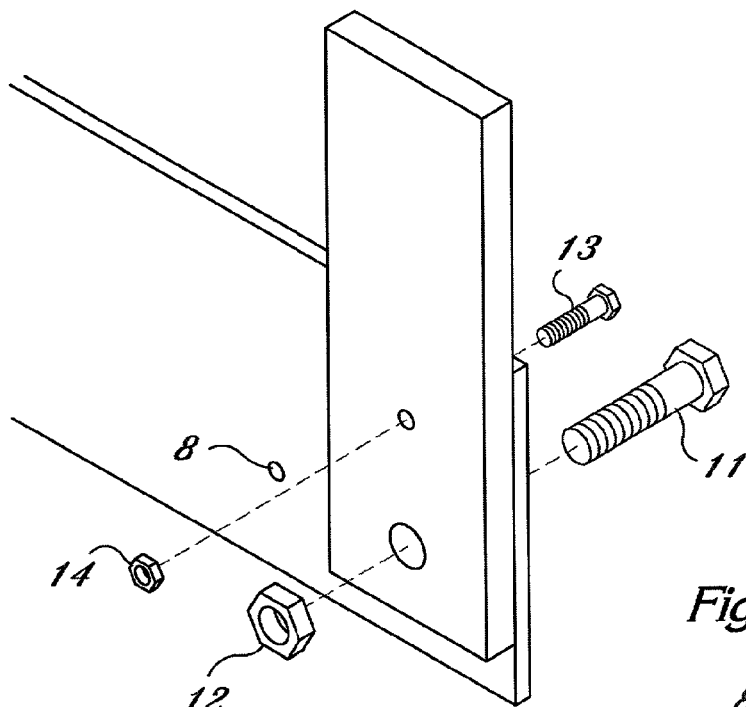
FIG. 8 is an exploded view of the fragment shown in FIG. 7.
Figure 9:
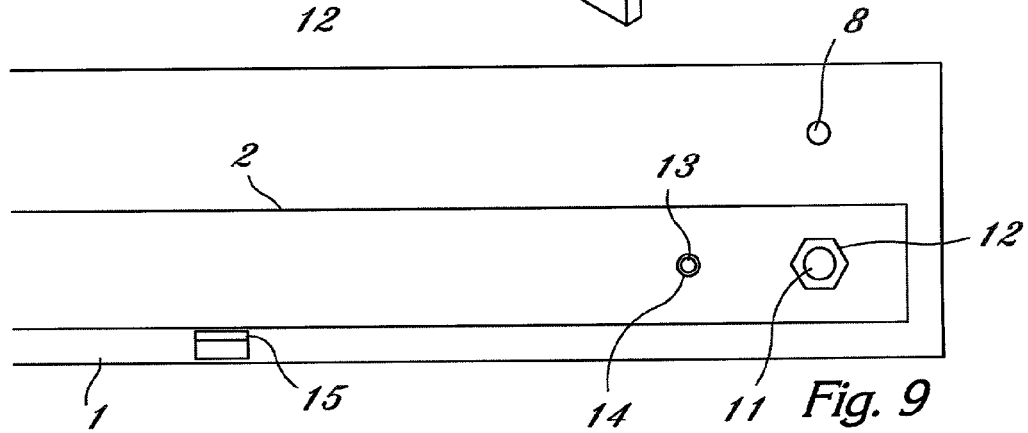
FIG. 9 is a view showing the leg of the cooking grill in a horizontal storage position.

As shown in FIG. 8, each leg 1 is provided with two openings which are spaced from one another in a vertical direction of the leg when the leg is in a vertical operative position. The corresponding area of the vertical wall of the bottom 1 is also provided with two vertical holes alignable with the holes in the leg. An additional hole 8 is provided which is horizontally spaced from the lower hole of the vertical portion of the bottom 1. In the position shown in FIG. 7, a bolt 11 extends through the lower opening of the leg and of the vertical portion of the bottom and is tightened with the nut, while another bolt 13 extends through the upper opening of the vertical portion of the bottom and the opening in the leg, so as to hold the leg in the vertical position. In order to displace the leg to a horizontal storage position shown in FIG. 9, the nut 14 is unscrewed and the bolt 13 is removed from the aligned openings, and the leg is turned over 90° to a horizontal position. Then the bolt 13 passes through the additional opening 8 in the vertical portion of the bottom and the opening of the leg 1, and the nut 14 is tightened.

Figure 10:
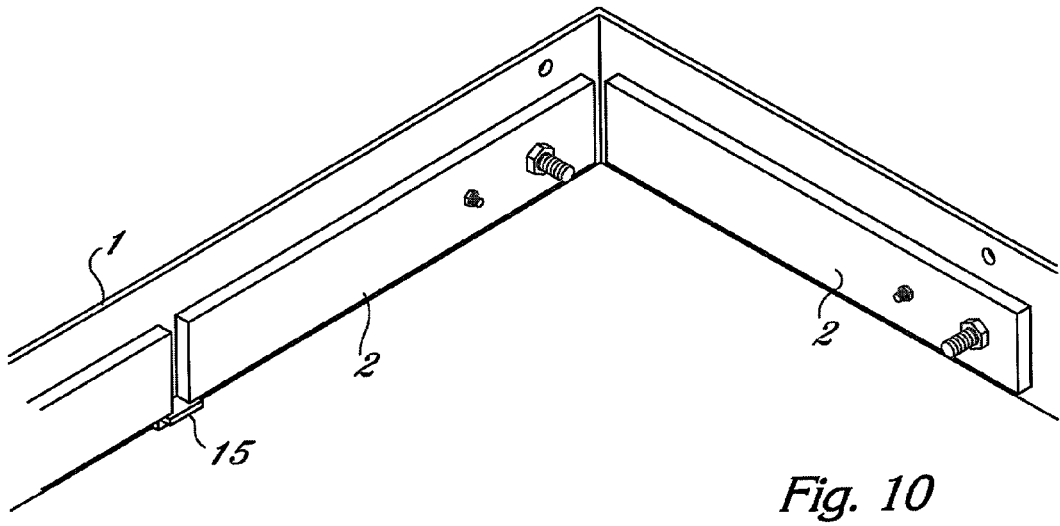
FIG. 10 is a perspective view showing the adjacent legs in the storage position.

As can be seen in the drawings, a projecting shoulder 15 can support the proximal ends of the two legs 1, or leg, and a supporting shoulder 16 can support another leg in the middle of the latter, as shown in FIG. 10.

It will be understood that each of the elements described above, or two or more together, may also find a useful application in other types of constructions differing from the types described above.

While the invention has been illustrated and described as embodied in a cooking grill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A cooking grill, comprising a bottom for accommodating a fire producing source; a plurality of legs turnably connected with said bottom and turnable between a storage position in which they are substantially coextensive with bottom and an operative position in which they extend substantially perpendicular from said bottom and upwardly from the latter; means for fixing said legs in each of said positions; a grate arrangeable between said legs; and means for holding said grate on said legs wherein said fixing means for fixing each of said leas in a storage position and in an operative position include two openings provided in one area of a vertical part of said bottom and including one opening, and two further opening spaced from said one opening in a vertical direction and in a horizontal direction, and two screwing means adapted to extend through each of said legs at two spaced locations and extend through said first opening and a respective one of said further opening so as to fix said leg respectively in said operative position and said storage position.

2. A cooking grill as defined in claim 1, wherein said holding means including arm means projecting from each of said legs.

3. A cooking grill as defined in claim 1; and further comprising handle means attached to said grate for displacing said grate between said grill and to a position outside of the cooking grill.

4. A cooking grill as defined in claim 1; and further comprising two substantially vertical supports provided at opposite sides of said bottom and formed to support an elongated product supporting element for cooking a corresponding product.

5. A cooking grill as defined in claim 4; and further comprising a fixing element provide at each side of said bottom and supporting a respective one of said vertical supports.

6. A cooking grill as defined in claim 1; and further comprising a supporting shoulder which supports at least one of said legs in said storage position.

7. A cooking grill as defined in claim 1; and further comprising a supporting shoulder which supports proximal ends of at least two said legs in said storage position.

\* \* \* \* \*